US012621600B2

(12) United States Patent
Christensen

(10) Patent No.: US 12,621,600 B2
(45) Date of Patent: May 5, 2026

(54) SPEAKER DEVICE WITH BISTABLE ACTIVE VENT

(71) Applicant: GN Hearing A/S, Ballerup (DK)

(72) Inventor: René Christensen, Valby (DK)

(73) Assignee: GN HEARING A/S, Ballerup (DK)

( * ) Notice: Subject to any disclaimer, the term of this patent is extended or adjusted under 35 U.S.C. 154(b) by 242 days.

(21) Appl. No.: 18/526,381

(22) Filed: Dec. 1, 2023

(65) Prior Publication Data

US 2024/0205591 A1 Jun. 20, 2024

(30) Foreign Application Priority Data

Dec. 16, 2022 (DK) .......................... PA 2022 70625

(51) Int. Cl.

*H04R 25/00* (2006.01)
*H04R 1/10* (2006.01)
*H04R 1/22* (2006.01)

(52) U.S. Cl.

CPC ............ *H04R 1/22* (2013.01); *H04R 1/1016* (2013.01); *H04R 25/456* (2013.01)

(58) Field of Classification Search

CPC ...... H04R 1/22; H04R 1/1016; H04R 25/456; H04R 1/1041; H04R 2460/11; H04R 9/06; H04R 9/02; H04R 2400/11

See application file for complete search history.

(56) References Cited

U.S. PATENT DOCUMENTS 12,389,168 B2 * 8/2025 Topliss ................ H04R 1/1091
2017/0295425 A1 10/2017 Grinker
2019/0116436 A1 * 4/2019 Lawand .............. H04R 1/1016
2022/0386016 A1 12/2022 Grinker
2023/0379637 A1 11/2023 Topliss et al.

FOREIGN PATENT DOCUMENTS

EP 2835987 2/2015
EP 3471432 4/2019
EP 3668117 6/2020
WO WO 2012/149970 11/2012

OTHER PUBLICATIONS

European Search Report for EP Patent Appln. No. 23217139 dated Apr. 10, 2024.
Foreign Office Action dated Jun. 23, 2023 for Danish patent application No. PA 2022 70625.

* cited by examiner

*Primary Examiner* — Brian Ensey
(74) *Attorney, Agent, or Firm* — Vista IP Law Group, LLP

(57) ABSTRACT

A speaker device configured to be worn at least partially in a user's ear canal. The speaker device comprises a speaker and an active vent to reduce occlusion of the ear canal. The active vent comprises a passage adapted to provide fluid communication between the ear canal and the user's surroundings when the speaker device is positioned in the ear canal. The active vent comprises a blocking mechanism having a closed state in which the blocking mechanism at least partially blocks the passage, and an open state in which the blocking mechanism blocks the passage less than in the closed state. The active vent further comprises a bistable device adapted to hold the blocking mechanism in the open state and in the closed state. Where the bistable device is unstable when the blocking mechanism is between the open and the closed state. Where the bistable arrangement comprises a bulging element.

20 Claims, 10 Drawing Sheets

100
130
160
110
120

160
130
110

120

140

150
180
190

SPEAKER DEVICE WITH BISTABLE ACTIVE VENT

RELATED APPLICATION DATA

This application claims priority to, and the benefit of, Danish Patent Application No. PA 2022 70625 filed on Dec. 16, 2022. The entire disclosure of the above application is expressly incorporated by reference herein.

FIELD

This disclosure relates to a speaker device with a bistable active vent for reduction of the occlusion effect.

BACKGROUND

Users of hearing devices, such as earbuds or hearing aids, often experience occlusion, when the ear canal is blocked by the device. This is caused by a build-up of sound pressure in the ear canal. Sounds at low frequencies, such as the user's own voice or chewing sounds, are particularly pronounced, which can be highly annoying for the user.

To reduce the occlusion effect, the hearing device can be provided with a vent which provides fluid connection between the ear canal and the outside of the ear canal. This allows the sound pressure in the ear canal to me reduced and the occlusion effect lessened. This however is not always an advantage, since the user in some cases benefits from a high sound pressure, for example if the user wants a more powerful bass when listening to music, or if a hearing aid user needs extra amplification of sound.

To achieve the advantages of having a vent and a closed ear canal, the hearing device can be provided with an active vent, which can be opened when a reduction of the occlusion effect is desired and closed when a greater sound pressure is desired. An active vent comprises a blocking device configured for selectively blocking the vent, thereby preventing fluid connection through the vent, or opening the vent to reduce the occlusion effect.

A problem in existing active vents is that the blocking device is not actively held in place in the intended position, i.e. open or closed, but is instead passively fixated by friction forces after being driven to the desired position. A reason for this is that the energy consumption is increased by actively fixating the blocking device, and it is almost always desired to keep energy consumption low, particularly for hearing aids, which are designed to be as small as possible and have as long operational time on a battery charge as possible. In current active vents where the blocking device is passively fixated, the user risks that the blocking device changes position if the hearing device is subjected to external forces, such as dropping the hearing device. Additionally, the friction is reduced over time, which further increases the risk of the blocking device changing its intended position.

It is an object to provide an active vent where these problems are reduced.

SUMMARY

In a first aspect, this is achieved by a speaker device adapted to be worn at least partially in a user's ear canal, where the speaker device comprises a speaker and an active vent to reduce occlusion of the ear canal, where the vent comprises a passage that is adapted to providing fluid connection between the ear canal and the user's surroundings when the speaker device is placed in the ear canal, and a blocking mechanism having a closed state in which the blocking mechanism at least partially blocks the passage, and an open state in which the blocking mechanism blocks the passage less than in the closed state, where the active vent further comprises a bistable device adapted to hold the blocking mechanism in the open state and in the closed state, where the bistable device is unstable when the blocking mechanism is between the open and the closed state.

In this context, unstable must be understood as meaning that the blocking mechanism in positions between the open and closed state will be driven towards one of the two states by a passive force, e.g. of a permanent magnet, a spring or material stresses, meaning that the blocking mechanism will be in a potential energy well in the open and the closed state and will have to cross an energy barrier to change state. As will be seen from subsequent embodiments, such a potential energy configuration can be provided in different ways.

An advantage of one or more of the embodiments described herein is that the bistable device will be stable when the blocking mechanism is in the open or closed state and will have to cross an energy barrier to move between the two, preventing sudden, unwanted switching between states or the blocking mechanism drifting between the open and the closed state. The user will thus achieve greater operational reliability. The vent according to some embodiments described herein will be able to find use in devices that during use block the user's ear canal, so that occlusion can occur. Such devices can be hearing devices designed to create sound in the user's ear canal, e.g. earphones and hearing aids, but it can also be passive devices such as earplugs and hearing protectors.

The speaker device can be a headphone configured for placement in a user's ear canal and at the opening of the ear canal. The hearing device can be a hearing aid configured to be placed behind a user's ear and/or in a user's ear canal. By hearing aid is understood a hearing device designed to pick up sounds with microphones, make an output sound signal from the picked up sounds by compensating for a user's hearing loss by and reproduce the output sound signal to the user with a loudspeaker and/or a cochlear implant.

The speaker device may be a hearing aid of the BTE [Behind The Ear] type, comprising a housing designed to be placed behind the user's ear, where the speaker for reproducing the output audio signal is located in the housing, and the sound from there is brought to the user's ear canal through a hollow sound tube. The hearing aid may be of the RIE [Receiver In Ear] type, comprising a BTE component with a housing adapted to be placed behind the user's ear, and a speaker device coupled to the BTE component, where the speaker for reproducing output the audio signal is located in the speaker device and the output signal is carried from the BTE component to the speaker device through an electrically conductive cable. The hearing aid can be of the type ITE [In The Ear] or CIC [Completely In Canal], which include a housing to be placed fully or partially in the user's ear canal, where the loudspeaker for reproduction of the output sound signal is placed in the housing. The speaker device of the second aspect may be a speaker device for an RIE hearing aid. The speaker device may be arranged to be coupled with the BTE component of a hearing aid.

The person skilled in the art will be able to understand that the active vent described herein will be able to be used in any device that blocks the user's ear canal and thereby creates an occlusion effect.

The blocking mechanism can have a center position, where the bistable device drives the blocking mechanism towards the open state when the blocking mechanism is between the open state and the center position, and towards the closed state when the blocking mechanism is between the center position and the closed state.

The active vent may include an electronic actuator. The electronic actuator may comprise a magnetic material comprising a permanent magnet, a paramagnetic material, a ferromagnetic material and/or a ferrimagnetic material, and an electromagnet, which in cooperation are configured to, upon activation, drive the blocking mechanism towards the open state or towards the closed state. One of the magnetic material and the electromagnet is movable, relative to the passage, on the blocking mechanism, and the other is arranged immovable, relative to the passage, so that when activated, the electromagnet will be able to attract or repel the magnetic material and thereby change the state of the blocking mechanism. In a preferred embodiment, the electromagnet is positioned immovably relative to the passage and the magnetic material is attached to the blocking mechanism so that the magnetic material is movable relative to the passage. This is an advantage, since the electromagnet is designed to be connected to an energy source, which connection will be more stable if the electromagnet is not movable. Hereby, the electronic actuator will be able to move the blocking mechanism from the open to the closed state and from the closed to the open state, which makes it simple for the user to switch between the states of the blocking mechanism.

The active vent may comprise a mechanical actuator adapted to move the blocking mechanism between the open and the closed state. The mechanical actuator may comprise a mechanical interface, such as a push button, a rotary switch and/or a sliding switch, which is arranged to, upon activation by the user, move the blocking mechanism between states. The advantage of a mechanical actuator will be that the extractor will not need electrical energy to move between the open state and the closed state and will thereby be able to operate with lower energy consumption.

The bistable device comprises a buckling element. The buckling element is configured to have a first stable shape and a second stable shape and to be able to change between the first and the second stable shape through temporary mechanical deformation, during which mechanical deformation the buckling element is unstable. When the buckling element is in its first stable shape, the blocking mechanism is in the open state, and when the bulging element is in its second stable shape, the blocking mechanism is in the closed state. The use of a buckling element in one or more embodiments described herein is particularly advantageous in that the blocking mechanism will be able to be held securely in each of the open and closed states, at the same time that a buckling element can be easily designed so that the force required to bring it through the temporary mechanical deformation between the stable forms, is low enough that it can be provided by a small electromagnet or the like, but not so low that spontaneous changes between the two forms will be a risk, e.g. if the user were to drop the speaker device.

The bistable device may comprise a first biasing element that is adapted to drive the blocking mechanism towards the open state, and/or a second incentive element that is adapted to drive the blocking mechanism towards the closed state. Each of the first and second biasing elements may comprise a spring and/or a magnet. The first biasing element may be arranged to exert a first force on the blocking mechanism, which first force drives the blocking mechanism towards the open state. The magnitude of the first force may be dependent on the position of the blocking mechanism. The second biasing element may be arranged to exert a second force on the blocking mechanism, which second force drives the blocking mechanism towards the closed state. The magnitude of the second force may be dependent on the position of the blocking mechanism. The first force may be greater than the second force when the blocking mechanism is between the open state and the center position. The second force may be greater than the first force when the blocking mechanism is between the closed state and the center position.

The blocking mechanism may comprise a plunger which is linearly movable between the open and closed states. The blocking mechanism may comprise a disc which is rotatably movable between the open and closed states. The blocking mechanism may comprise a diaphragm that can be bent between the open and the closed state.

The speaker device may comprise a sealing element that is configured to seal the inside of the ear canal from the user's surroundings when the speaker device is placed in the ear canal. The sealing element may be provided by a silicone element or an element of a material with compression properties similar to silicone. The sealing element can be shaped like a dome. The sealing element can be removable so that the user can change it without the use of tools. The advantage of using a sealing element is that a higher sound pressure can be achieved in the ear canal. However, this comes at the expense of the occlusion effect, which can be counteracted at least partially by the active exhaust, so that the advantage from the sealing element is achieved, while the disadvantage is reduced.

DESCRIPTION OF THE DRAWINGS

The above and other features and advantages will become apparent to those skilled in the art from the following detailed description of embodiments together with references to the following figures, in which.

DETAILED DESCRIPTION

Figure 1A:
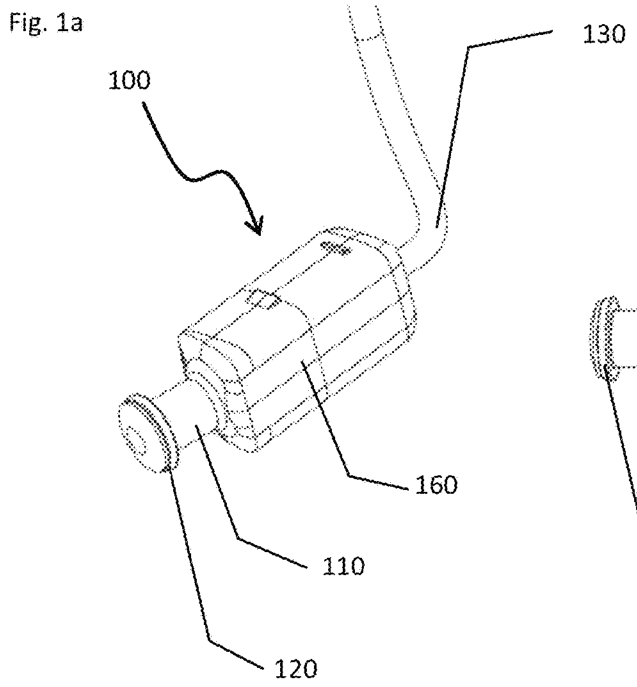
FIG. 1*a* is a schematic view of a speaker device according to the prior art.
Figure 1B:
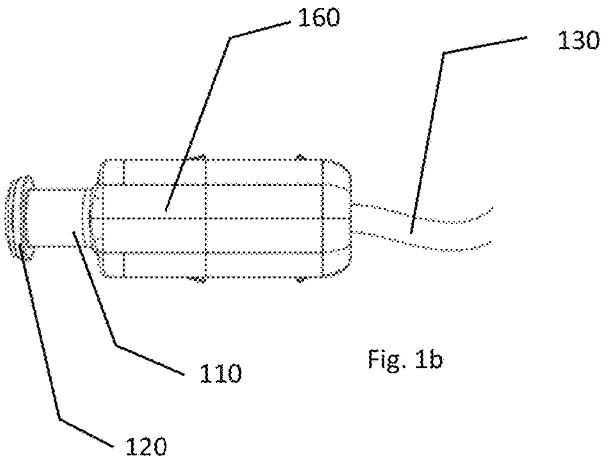
FIG. 1*b* is a schematic view of a speaker device according to the prior art.
Figure 1C:
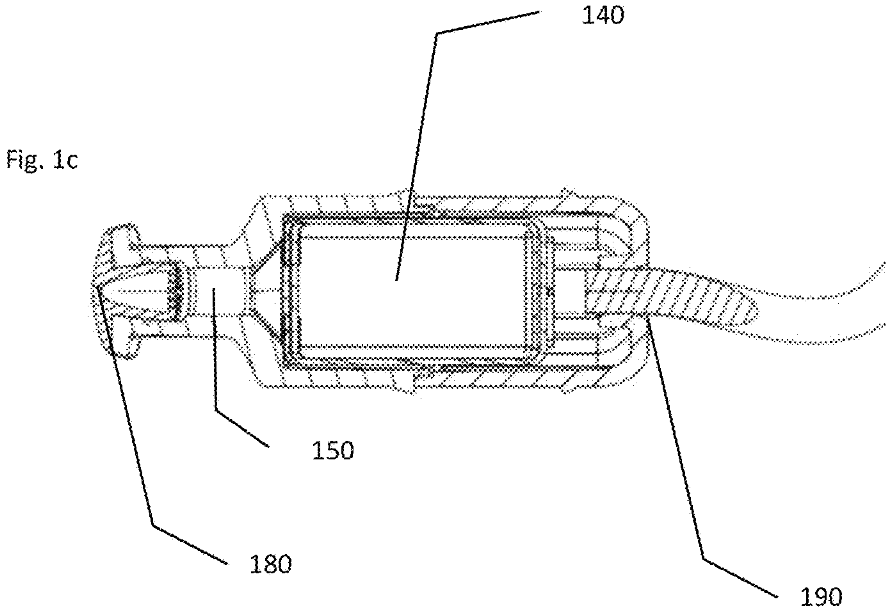
FIG. 1*c* is a cross-sectional view of a speaker device according to the prior art.
Figure 1D:
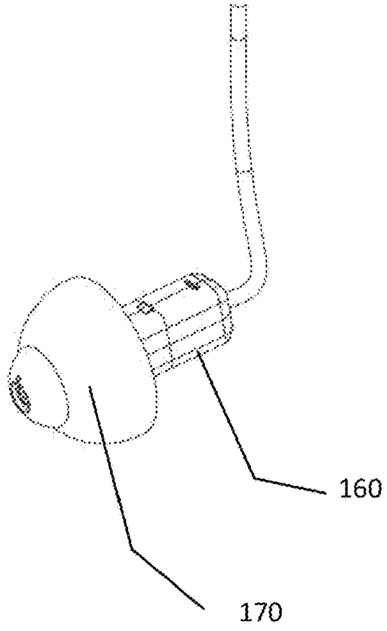
FIG. 1*d* is a schematic representation of a speaker device according to the prior art.
Figure 1E:
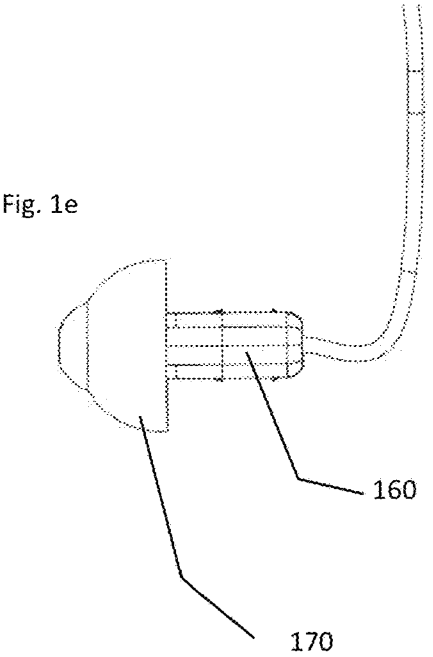
FIG. 1*e* is a schematic view of a speaker device according to the prior art.
Figure 1F:
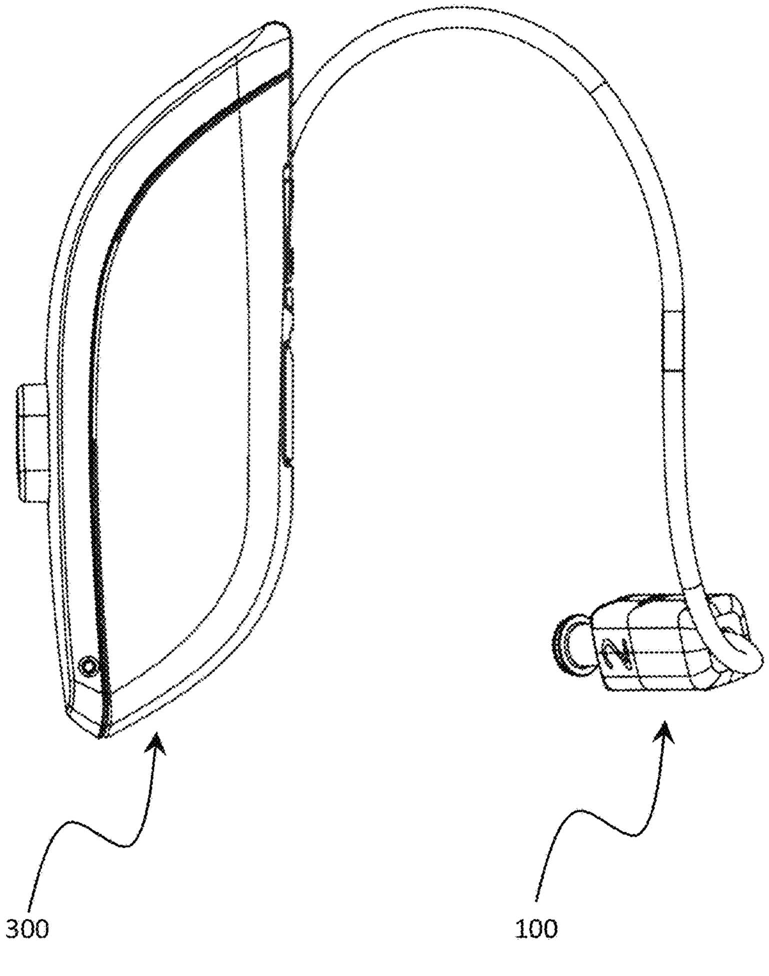
FIG. 1*f* is a schematic representation of a hearing aid with a speaker device according to the prior art.

Various embodiments are described hereinafter with reference to the figures. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

FIG. 1*a-f* show a speaker device 100 according to the prior art. The speaker device 100 is configured to be placed at least partially in a user's ear canal and to be connected to a BTE component 200 of a hearing aid of the type Receiver In Ear, RIE. The speaker device 100 comprises a housing 160 with a distal end 180 that is arranged to face the user's eardrum when the speaker device 100 is arranged in the ear canal, and a proximal end 190 that is arranged to face away from the ear canal when the speaker device 100 is arranged in the ear canal. The housing 160 houses a speaker 140, which is arranged to receive an electrical input signal and convert it into an acoustic output signal for the user. The speaker device 100 comprises a coupling element 130 with an electric wire, which coupling element 130 is designed to connect the speaker device 100 to the BTE component 300. The housing comprises a neck 110 in the form of a cylinder which, during use, protrudes into the ear canal. The cylinder has a cavity 150 so that, during use, a fluid connection is provided between the inside of the housing 160 and the distal end 190, and thereby the speaker 140 and the ear canal, so that the speaker 140 can generate an acoustic output signal that is sent into the ear canal.

In order to secure the speaker device 100 in the ear canal and to ensure that the speaker 140 can create the necessary sound pressure in the ear canal, the speaker device 100 comprises a sealing element 170. The sealing element 170 comprises a hollow cylinder which is attached to a fastening flange 120 which is formed on the neck 110. The sealing element 170 further comprises a dome of a flexible material, such as silicone, which during use rests against the user's ear canal and through friction with the ear canal holds the speaker device 100 in place. As mentioned, the sealing element 170 has the additional function of sealing the ear canal at least partially from the surroundings, i.e. the outside of the user's ear canal, so that a greater sound pressure can be achieved during use of the speaker device 100. The disadvantage of this is that an occlusion effect is simultaneously created, where sounds from the user's body, e.g. speech or vibrations are amplified in the ear canal due to the seal, which can feel uncomfortable for the user.

Figure 2A:
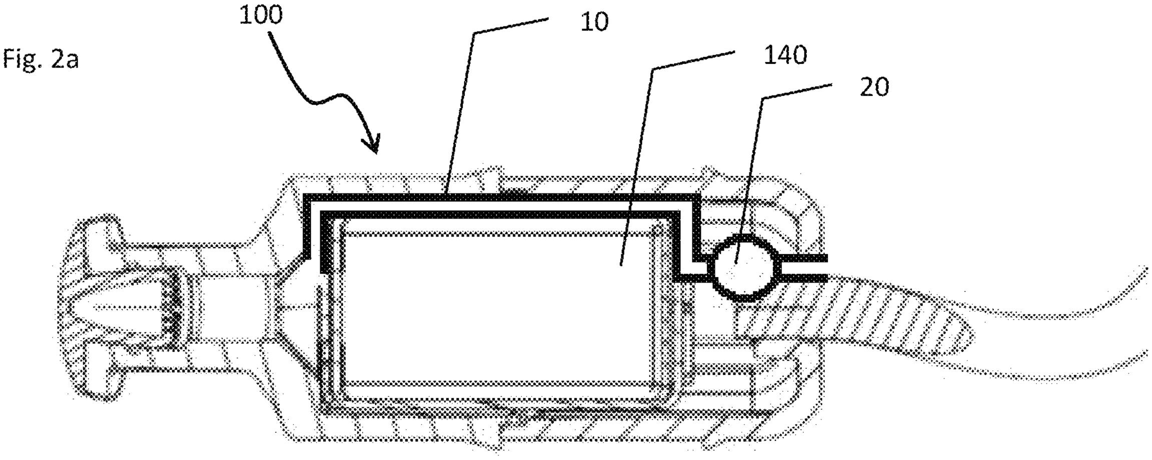
FIG. 2*a* is a cross-sectional view of a speaker device according to some embodiments.
Figure 2B:
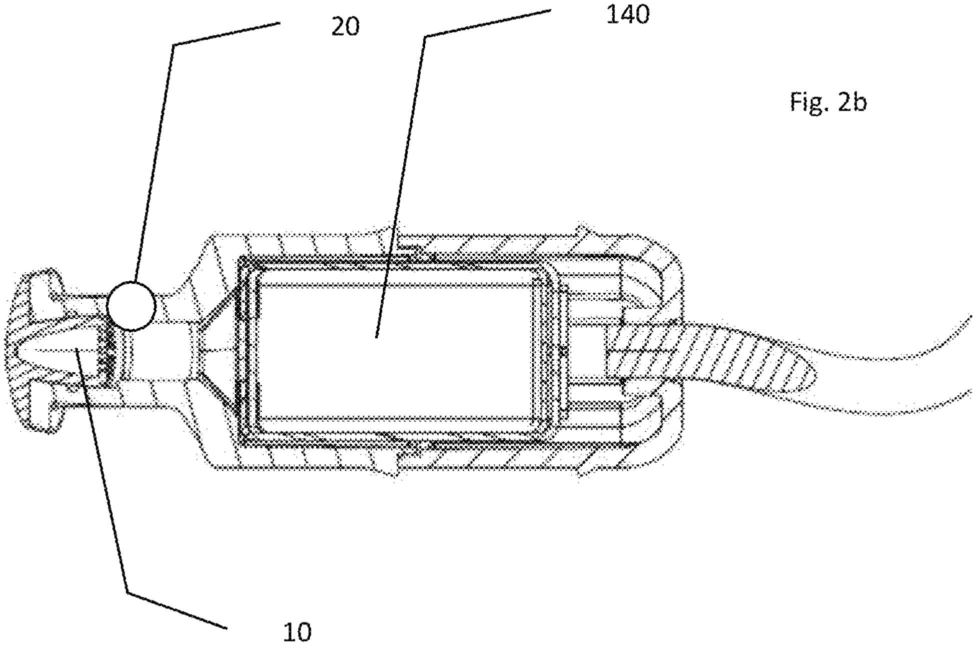
FIG. 2*b* is a cross-sectional view of a speaker device according to some embodiments.

FIGS. 2*a* and 2*b* show a speaker device 100 according to some embodiments. To reduce the occlusion effect, the speaker device 100 includes an active vent. The active vent includes a passage 10 which is designed to create a fluid connection between the ear canal, i.e. the part of the ear canal which is sealed by the sealing element 170, and the user's surroundings, i.e. the opposite side of the seal, so that a drain is provided for the sound pressure in the ear canal, thereby reducing the occlusion. The active vent further comprises a blocking mechanism 20 having a closed state in which the blocking mechanism 20 blocks the passage 10 in whole or in part, and an open state in which the blocking mechanism 20 blocks the passage 10 less than in the closed state. This provides the possibility of selectively choosing the open mode, if it is necessary to reduce the occlusion effect, or the closed mode, if a greater sound pressure is needed.

The active vent further comprises a bistable element 30 which is designed to hold the blocking mechanism 20 in the open state and in the closed state, where the bistable device 30 is unstable when the blocking mechanism 20 is between the open and the closed state. The bistable device 30 is described in further detail below.

In the embodiment shown in FIG. 2*a*, the passage 10 runs through the housing 160 and connects the cavity 150 of the neck 110 with the proximal end 190. Hereby, the cavity 150 forms part of the passage 10, so that the passage 10 provides fluid connection between the two sides of the sealing element 170. In this embodiment, the blocking mechanism is arranged near the proximal 190, but it could be arranged anywhere along the passage 10.

In the embodiment shown in FIG. 2*b*, the neck 110 is provided with an opening that connects the cavity 150 with the outside of the housing 160. Hereby, the passage 10 is provided by the cavity 170, the distal end 180 being in fluid connection with the outside of the sealing element 170 through the cavity 170 and the opening in the neck 110 In this embodiment, the blocking mechanism is arranged at the opening in the neck so that the area of the opening can be limited or blocked, whereby the fluid connection between the two sides of the sealing element 170 can be controlled.

Figure 3:
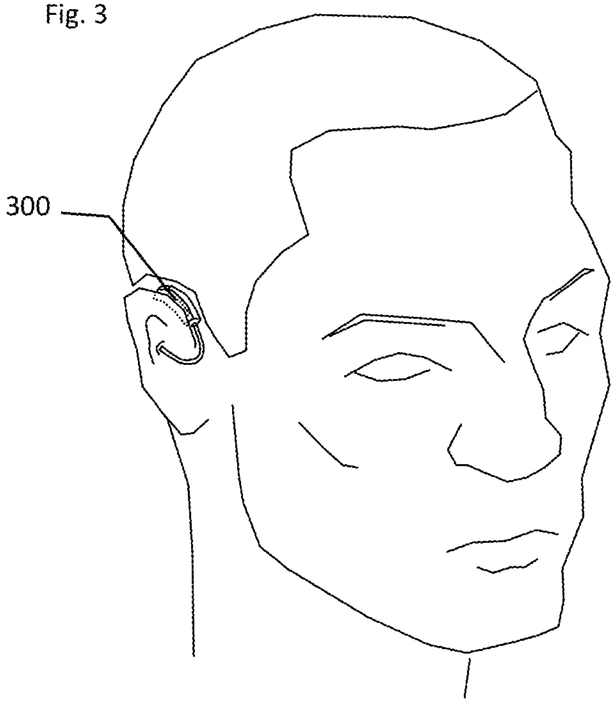
FIG. 3 shows an illustration of a user with a hearing aid with a speaker device according to some embodiments.

FIG. 3 shows how a hearing device comprising a BTE component 300 and a speaker device 100 according to some embodiments is placed on the user. The BTE component 300 is worn behind the user's ear, while the speaker device 100 is arranged in the user's ear canal, and therefore cannot be seen in FIG. 3.

Figure 4A:
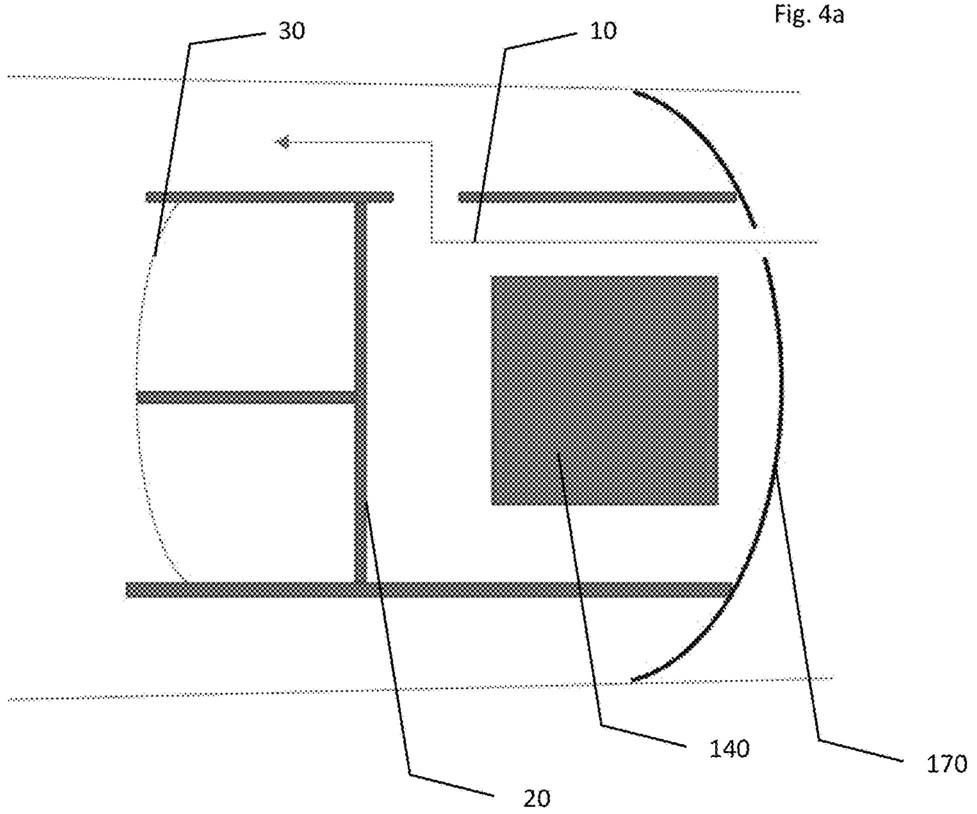
FIG. 4*a* is an illustration of a speaker device according to some embodiments in the open state.
Figure 4B:
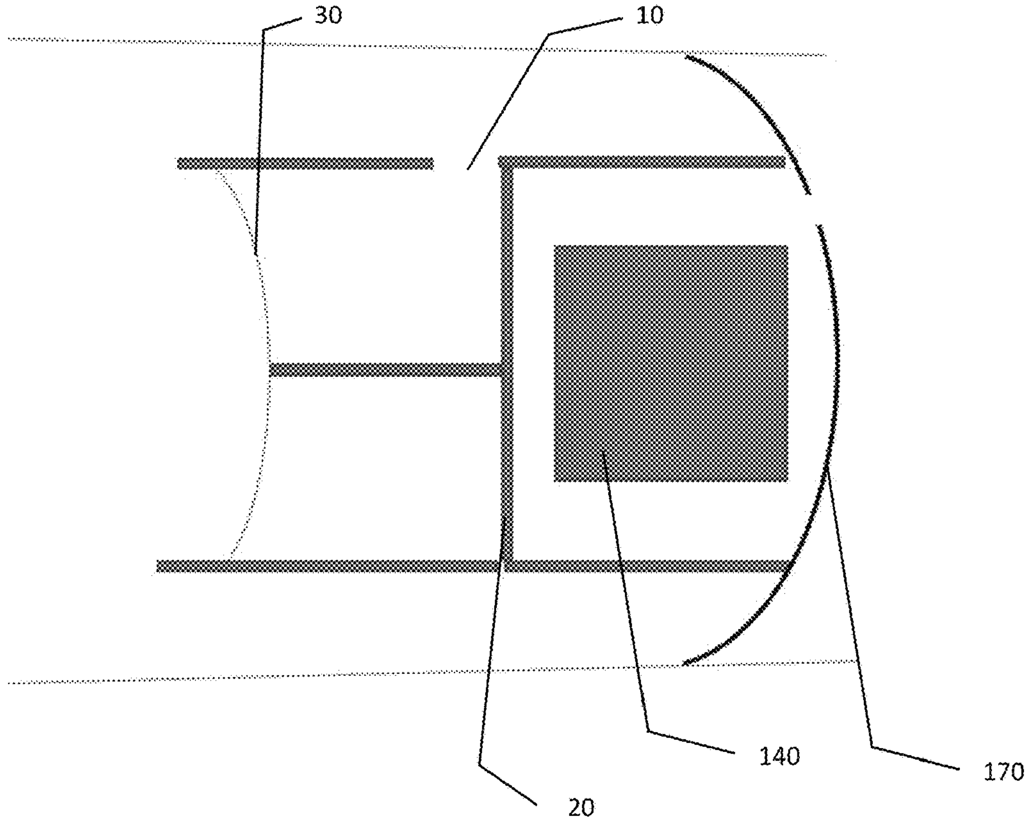
FIG. 4*b* is an illustration of a speaker device according to some embodiments in the closed state.

FIGS. 4*a* and 4*b* show a speaker device 100 according to some embodiments with the blocking mechanism 20 in the open state and the closed state, respectively. As described above, the speaker device 100 comprises a speaker 140 which is arranged to convert an electrical input signal into an acoustic output signal, a sealing element 170 which is arranged to seal the inside of the ear canal from the surroundings when the speaker device 100 is placed in the ear canal. In the embodiment shown, the active vent comprises a passage 10 that extends between an opening in the sealing element 170 and an opening in the housing 160, so that a fluid connection is provided between the two sides of the sealing element. The active vent further comprises a blocking element 20 which is linearly displaceable between a closed state in which the blocking mechanism 20 is pushed forward so that the passage 10 is blocked, and an open state in which the blocking mechanism 20 is retracted so that the passage 10 is not blocked.

The active vent further comprises a bistable device 30 connected to the blocking mechanism 20, in the form of a buckling element, which is unstable when the blocking mechanism 20 is not in the open state or the closed state, i.e. when the blocking mechanism 20 is between the open state and the closed state. The buckling element has a first stable shape and a second stable shape, and the buckling element can be changed between the stable shapes by temporary deformation. The buckling element is configured to counteract this deformation, so that the buckling element drives the blocking mechanism 20 towards the open state when the blocking mechanism 20 is between the open state and the center position. Likewise, the buckling element drives the blocking mechanism 20 toward the closed state when the blocking mechanism 20 is between the closed state and the center position.

Figure 5:
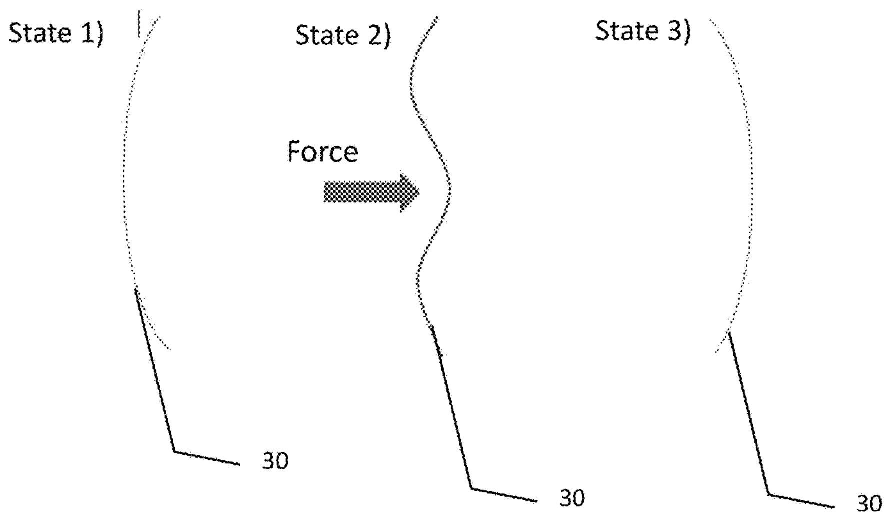
FIG. 5 is an illustration of a buckling element for use in a device according to some embodiments in three different states.

FIG. 5 shows a buckling element for use in the bistable device according to some embodiments in three different states, 1), 2), and 3), corresponding respectively to the open state, the center position, i.e. a state between the open and the closed state, and the closed state. The buckling element is tensioned, so that in state 1), i.e. the bulge element's first stable shape, buckles out to one side, and that in state 3), i.e. the second stable shape of the buckling element, buckles out to another side, while in state 2) the buckling element undergoes deformation through a force effect, so that it can change between the stable shapes. In state 2), mechanical stresses in the buckling element will cause the buckling element to be unstable so that it will switch to either the first or second stable shape depending on which of these requires the least energy to switch to. This change of shape can be translated to a linear displacement, e.g. as shown in FIG. **4*a/b* so that the buckling element can be used to move the blocking mechanism 20 between the open and the closed state. In order to move the blocking element 20 between the open and the closed state, an activation mechanism can be provided which is arranged to exert an external force on the blocking mechanism in the direction towards the open and/or the closed state, e.g. in the form of an electronic actuator with an electromagnet or a mechanical actuator with a push button, which is arranged to transfer a pressure from the user to the blocking mechanism 20**.

Figure 6:
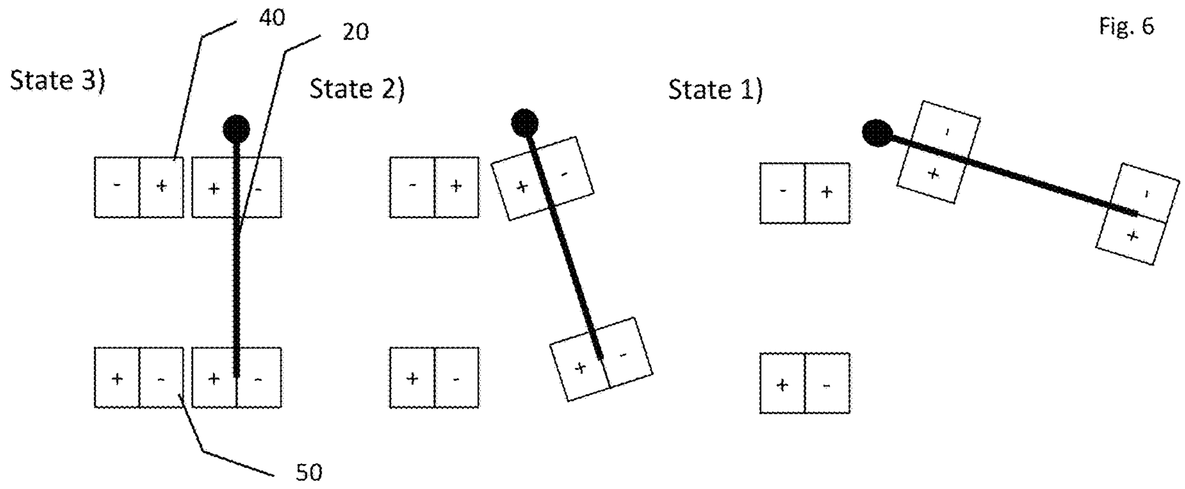
FIG. 6 is an illustration of a magnetically bistable active extractor according to some embodiments.

FIG. 6 shows a magnetic bistable device according to some embodiments in three different states, 1), 2), and 3), corresponding respectively to the open state, a center position, i.e. a state between the open and the closed state, and the closed state. In the embodiment shown, the blocking mechanism 20 is rotatably mounted to a pivot point so that it can be rotated between states 1) and 3). The magnetic bistable device comprises a first biasing element 40 which is configured to drive the blocking mechanism 20 towards the open state, and a second biasing element 50 which is configured to drive the blocking mechanism towards the closed state. The first biasing element 40 comprises a set of permanent magnets which are arranged to repel each other, with one magnet connected to the blocking mechanism 20, thereby providing a force which drives the blocking mechanism 20 towards the open state. The second biasing element 50 comprises a set of permanent magnets arranged to attract each other, with one magnet connected to the blocking mechanism 20, thereby providing a force which drives the blocking mechanism 20 towards the closed state.

The first biasing element 40 is arranged closer to the pivot point than the second biasing element 50, which means that the second biasing element 50 affects the blocking mechanism 20 with a greater torque than the first biasing element 40 when the blocking mechanism is in the closed state, so that the blocking mechanism is maintained in the closed state. When the blocking mechanism 20 is rotated towards the open state, the distance between the magnets in the first biasing element 40 will decrease less than the distance between the magnets in the second biasing element 50, the second biasing element being arranged further from the pivot point. This causes the attraction force between the magnets in the second biasing element 50 to decrease more than the repulsion force between the magnets in the first biasing element 40, so that the torque from the first biasing element 40 exceeds the torque from the second biasing element 50 when the blocking mechanism is rotated past the center position. In order to move the blocking mechanism 20 between the open and the closed state, an activation mechanism can be provided which is configured to exert an external force on the blocking mechanism in the direction towards the open and/or the closed state, e.g. in the form of an electronic actuator with an electromagnet or a mechanical actuator with a push button, which is arranged to transfer a pressure from the user to the blocking mechanism 20.

Figure 7:
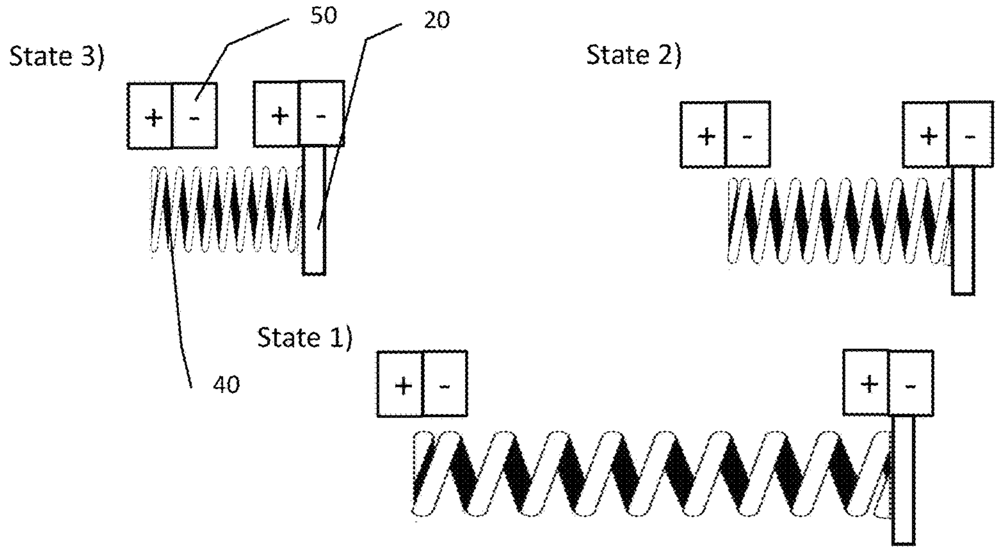
FIG. 7 is an illustration of a spring-driven and magnetically bistable active vent according to some embodiments.

FIG. 7 shows a spring/magnetic bistable device according to some embodiments in three different states, 1), 2), and 3), corresponding respectively to the open state, the center position, and the closed state. The spring/magnetic bistable device comprises a first biasing element 40 which is adapted to drive the blocking mechanism 20 towards the open state, and a second biasing element 50 which is adapted to drive the blocking mechanism 20 towards the closed state. The first biasing member 40 comprises a spring which is more compressed when the blocking mechanism 20 is in the closed state 20 than when the blocking mechanism 20 is in the closed open 20, thereby providing a force that drives the blocking mechanism 20 towards the open state. The second biasing element 50 comprises a set of permanent magnets arranged to attract each other, one magnet being connected to the blocking mechanism 20, thereby providing a force which drives the blocking mechanism 20 towards the closed state.

The first and second biasing elements 40, 50 are arranged so that the attractive force between the magnets is greater than the spring force when the blocking element 20 is in the closed state and between the closed state and the center position. Since the magnetic attraction is dependent on the distance between the magnets to the minus third power, while the spring force is linear, the attraction force from the magnets will decrease more than the force from the compressed spring when the blocking mechanism 20 is moved from the closed state to the open state. Between the center position and the open state, the magnetic attraction force from the second biasing element 50 will be reduced so much that it will be less than the spring force from the first biasing element 40, from which the spring force will be dominant in pushing the blocking mechanism 20 to the open state. In order to move the blocking element 20 between the open and the closed state, an activation mechanism can be provided which is arranged to exert an external force on the blocking mechanism in the direction towards the open and/or the closed state, e.g. in the form of an electronic actuator with an electromagnet or a mechanical actuator with a push button, which is arranged to transfer a pressure from the user to the blocking mechanism 20.

Through the embodiments shown, the person skilled in the art will be able to understand how other bistable devices than those shown can be provided by using other configurations of incentive elements comprising one or more springs and/or one or more sets of magnets arranged so that the force from the first biasing element 40 on the blocking mechanism 20 will be greater than the force from the second biasing element 50 when the blocking mechanism is between the open state and the center position, and also that the force from the first biasing element 40 on the blocking mechanism 20 will be less than the force from the second biasing element 50 when the blocking mechanism is between the closed state and the center position.

Figure 8A:
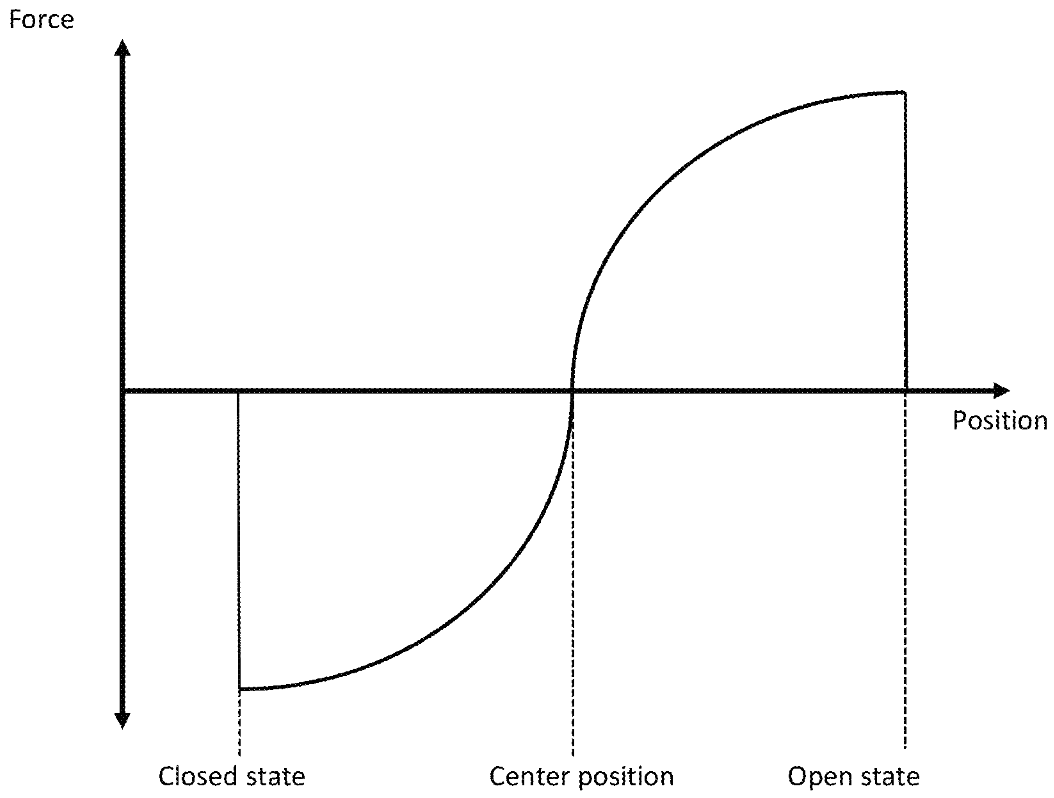
FIG. 8*a* shows a force diagram for a bistable active vent according to some embodiments.

FIG. 8*a* shows a force diagram illustrating the force which a bistable device according to some embodiments exerts on the blocking mechanism depending on the position of the blocking element. Between the closed state and the center position, the force will be negative, corresponding to a force directed towards the closed state. Between the open state and the center position, the force will be positive, corresponding to a force directed towards the open state. In the two stable states the force goes to zero, as the bistable device is stable in these states.

Figure 8B:
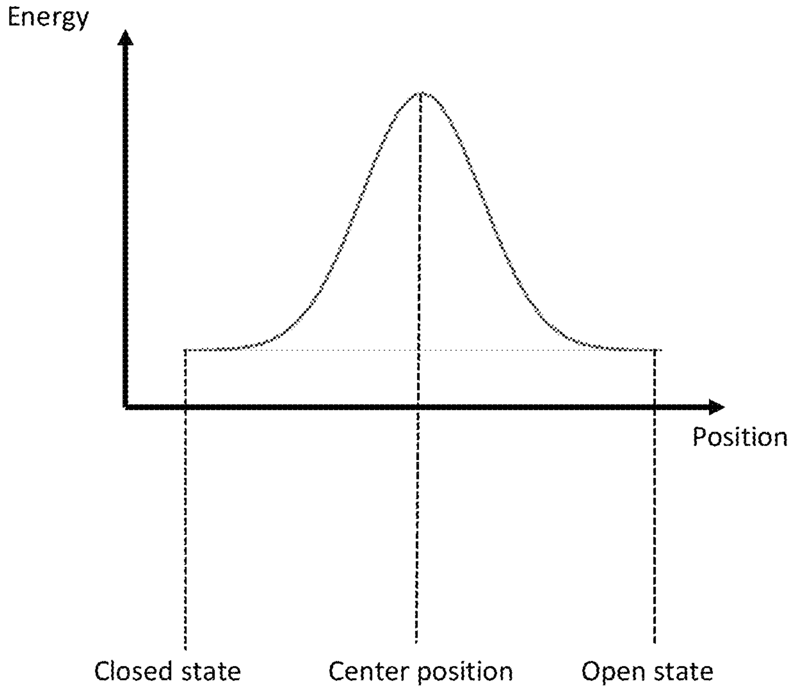
FIG. 8*b* shows an energy diagram for a bistable active vent according to some embodiments.
Figure 9A:
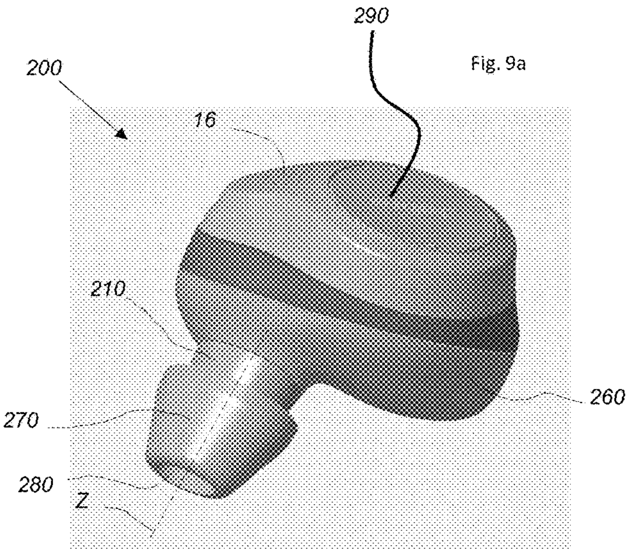
FIG. 9*a* is a schematic view of a speaker device according to some embodiments.
Figure 9B:
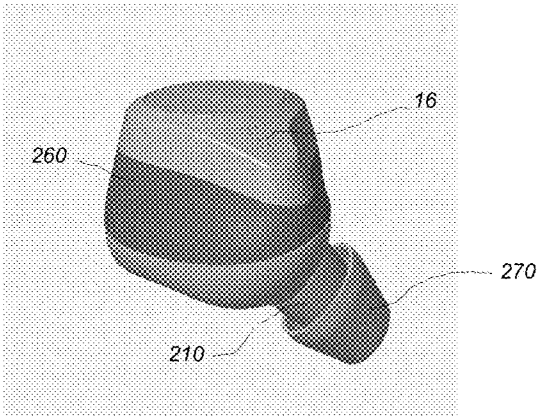
FIG. 9*b* is a schematic view of a speaker device according to some embodiments.
Figure 9C:
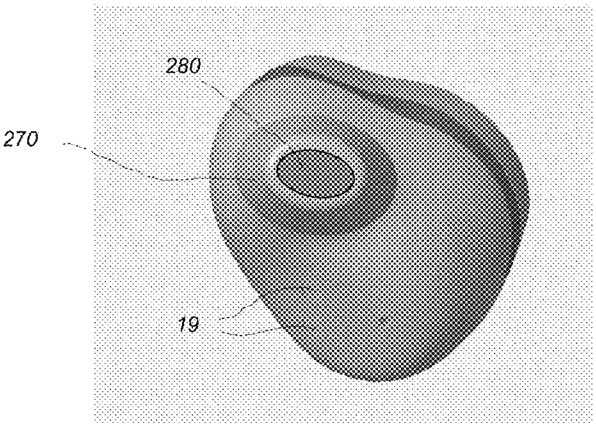
FIG. 9*c* is a schematic view of a speaker device according to some embodiments.
Figure 9D:
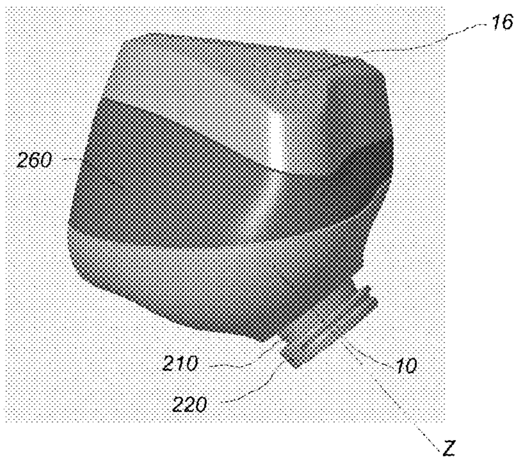
FIG. 9*d* is a schematic view of a speaker device according to some embodiments.
Figure 9E:
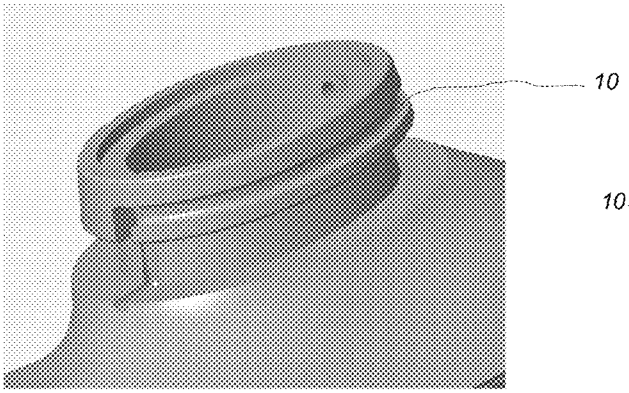
FIG. 9*e* is a schematic view of a speaker device according to some embodiments.
Figure 9F:
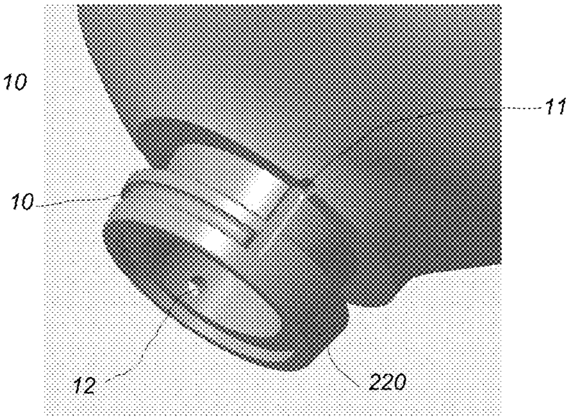
FIG. 9*f* is a schematic view of a speaker device according to some embodiments.
Figure 9G:
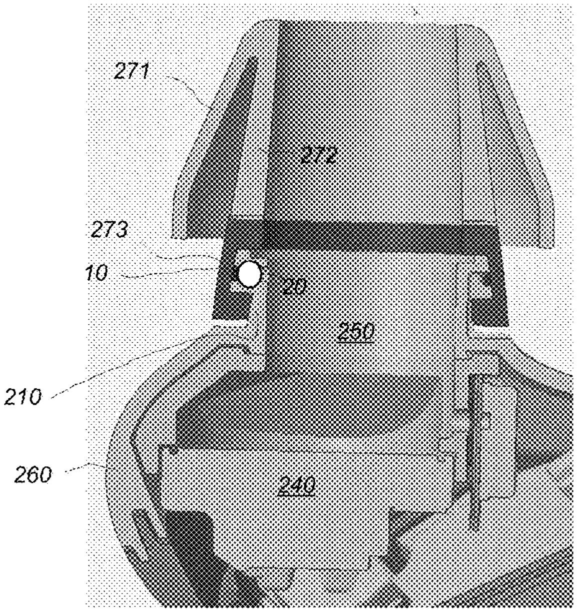
FIG. 9*g* is a cross-sectional view of a speaker device according to some embodiments.
Figure 9H:
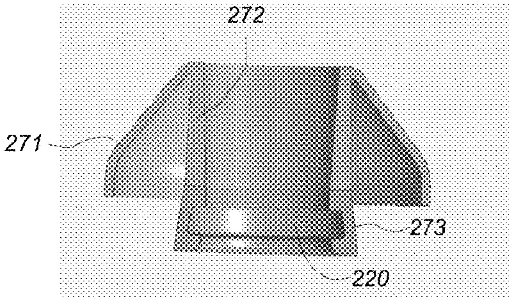
FIG. 9*h* is a cross-sectional view of a speaker device according to some embodiments.

FIG. 8*b* shows an energy diagram illustrating the potential energy of the blocking mechanism 20 connected to a bistable device according to some embodiments. As can be seen from the figure, the blocking mechanism 20 will be in an energy well when the blocking mechanism 20 is in the open state and in the closed state. To be moved between the two states, the energy barrier between the two energy wells must be overcome.

FIG. 9*a-h* show a speaker device 200 according to some embodiments in the form of an earphone. The speaker device 200 comprises a housing 260 with a distal end 280 that is arranged to face the user's eardrum when the speaker device 200 is arranged in the ear canal, and a proximal end 290 that is arranged to face away from the ear canal when the speaker device 200 is arranged in the ear canal. The housing 260 contains a speaker 240 which is arranged to receive an electrical input signal and convert it into an acoustic output signal for the user. The housing includes a neck 210 in the form of a cylinder that protrudes into the ear canal during use. The cylinder has a cavity 250 so that, during use, a fluid connection is provided between the inside of the housing 260 and the distal end 290, and thereby the speaker 240 and the ear canal, so that the speaker 140 can generate an acoustic output signal that is sent into the ear canal.

In order to secure the speaker device 200 in the ear canal and to ensure that the speaker 240 can create the necessary sound pressure in the ear canal, the speaker device 200 comprises a sealing element 270. The sealing element 270 comprises a hollow cylinder which is attached to a fastening flange 220 which is formed on the neck 210. The sealing element 270 comprises a hollow cylinder 272 with a base 273 which is adapted to engage with fastening flanges 220 so that the sealing element 270 can be attached to the housing 260. The sealing element 270 further comprises a dome 271 of a flexible material such as silicone, which during use rests against the user's ear canal and through friction with the ear canal holds the speaker device 200 in place. As mentioned, the sealing element 270 has the additional function of sealing the ear canal at least partially from the surroundings, i.e. the outside of the user's ear canal, so that a greater sound pressure can be achieved during use of the speaker device 200.

To reduce the occlusion effect, the speaker device 200 has an active vent comprising a passage 10. the passage 10 is provided by a recess formed in the housing 260, the neck 210 and the attachment flange 220. The recess extends between an internal opening 12 in the form of a through hole connecting the recess with the cavity 250 in the neck 210, and an outer opening 11 at the base of the neck 210. When the sealing element 270 is mounted on the fastening flange 220, the recess is covered so that a closed channel is formed that connects the two sides of the seal of the ear canal, thereby forming fluid connection between the ear canal and the surroundings when the speaker device 200 is placed in the user's ear. The active vent further comprises a blocking mechanism 20 and a bistable device arranged so that the blocking mechanism 20 can close the passage 20 at least partially.

Figure 10:
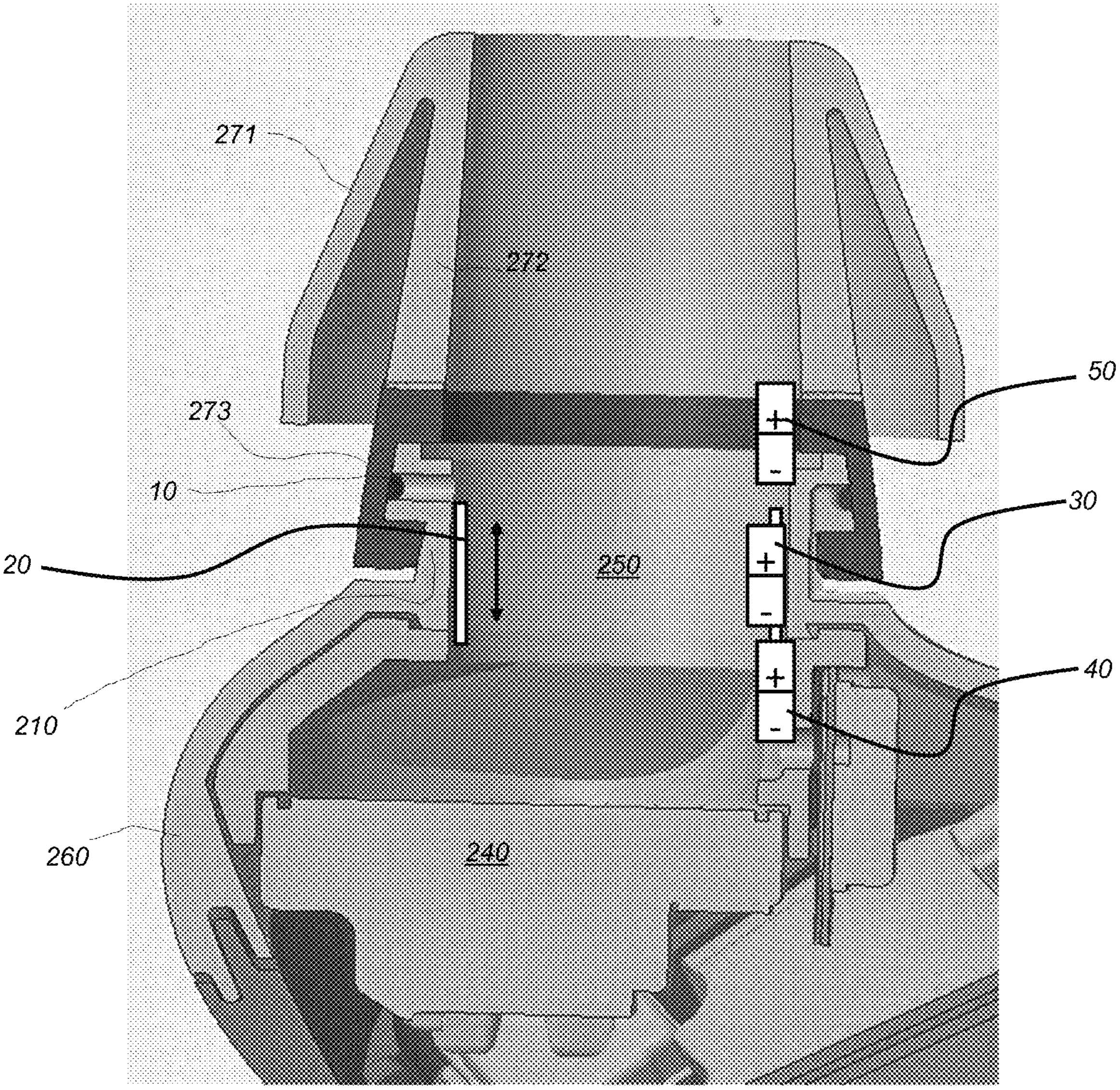
FIG. 10 is a cross-sectional view of a speaker device according to some embodiments.

FIG. 10 shows a speaker device according to some embodiments similar to that shown in FIG. 9*a-h*. This embodiment differs from that of FIG. 9*a-h*. in that the blocking mechanism 20 is provided by a hollow cylinder arranged concentrically with the neck 210. The blocking mechanism 20 is linearly displaceable along the longitudinal axis (z) of the neck so that the blocking mechanism can be displaced forward towards the distal end 280 where it at least partially blocks it through hole 20 that connects the cavity 250 of the neck with the recess. This blocks or reduces the fluid connection, the passage 10 being at least partially closed. The blocking mechanism can also be moved linearly back towards the proximal end 290, where it blocks the through hole less than in the closed state or does not cover the through hole 20 at all. This provides the fluid connection, as the blocking mechanism 20 exposes the passage 10, thereby opening it.

In the embodiment shown, the bistable device 30 is provided by a first biasing element 40 comprising a first permanent magnet, a second biasing element 50 comprising a second permanent magnet and a third permanent magnet. The third permanent magnet is attached to the blocking mechanism 20 so that it is linearly displaceable together with the blocking mechanism 20. The first permanent magnet is arranged in the housing and so that it attracts the third magnet, thereby driving the blocking mechanism 20 towards the open state. The second permanent magnet is arranged at the inner opening 12 and such that it attracts the third magnet to thereby drive the blocking mechanism 20 towards the closed state. Since the magnitude of the magnetic force between the first and third magnets and between the second and third magnets is dependent on the distance between the respective magnets, the magnetic force between the first and third magnets will be greater than the magnetic force between the second and third magnet when the blocking mechanism 20 is between the open state and the center position, meanwhile, the magnetic force between the second and third magnets will be greater than the magnetic force between the first and third magnets when the blocking mechanism 20 is between the closed state and the center position.

The blocking mechanism 20 of the embodiments shown in FIGS. 9*a-h* and 10, could alternatively be connected to one of the bistable devices shown in previously described embodiments. It can also be connected to a mechanical or electronic actuator that will be able to apply an external force to change the bistable device between the first and the second stable state, thereby moving the blocking mechanism 20 between the open and the closed state.

Use of the terms “first”, “second”, “third”, and “primary”, “secondary”, “tertiary”, etc., do not imply any specific order or importance, but are used to identify individual elements. Furthermore, the use of the term “first” does not imply the presence of a “second”, “third”, etc. and vice versa.

It is noted that the term “comprises” does not exclude the presence of other elements or method steps than those listed.

It is noted that the term “an” or “an” does not exclude the presence of more or other elements or method steps than those listed.

Although elements and features are shown and described above, it will be understood that they are not intended to limit the claimed invention, and it will be obvious to those skilled in the art that changes and modifications can be made without departing from the spirit and scope of the invention according to the claims. The description and drawings must therefore be considered in an illustrative and descriptive manner. The invention as claimed is intended to cover all alternatives, modifications and equivalents.

LIST OF REFERENCE NUMBERS

10 passage
11 external opening
12 internal opening
20 blocking mechanism
30 bistable mechanism
40 first biasing element
50 second biasing element
100 speaker device
110 neck
120 fastening flange
130 connecting element
140 speaker
150 cavity
160 housing
170 sealing element
180 distal end
190 proximal end
200 loudspeaker arrangement
210 neck
220 fastening flange
230 connecting element
240 speaker
250 cavity
260 housing
270 sealing element
271 dome of sealing element
272 hollow cylinder of sealing element
273 base of sealing element
280 distal end
290 proximal end
300 BTE-component

The invention claimed is:

1. A speaker device configured to be worn at least partially in an ear canal or a user, the speaker device comprising:
- a speaker;
- an active vent configured to reduce occlusion of the ear canal, where the active vent comprises:
  - a passage that is configured to provide a fluid connection between the ear canal and a surrounding of the user when the speaker device is in the ear canal of the user,
  - a blocking mechanism having a closed state in which the blocking mechanism blocks the passage at least partially, and an open state in which the blocking mechanism does not block the passage or blocks the passage less compared to an amount of passage blocking in the closed state, and
  - a bistable device configured to keep the blocking mechanism in the open state or the closed state;
- wherein the bistable device comprises a buckling element, wherein the buckling element is configured to transition between a first state in which the buckling element bends towards a first direction, and a second state in which the buckling element bends towards a second direction opposite from the first direction.

2. The speaker device according to claim 1, wherein the blocking mechanism is unstable when the blocking mechanism is between the open and the closed state.

3. The speaker device according to claim 1, wherein the blocking mechanism has a center position, wherein the bistable device is configured to drive the blocking mechanism toward the open state when the blocking mechanism is between the open state and the center position, and wherein the bistable device is configured to drive the blocking mechanism toward the closed state when the blocking mechanism is between the center position and the closed state.

4. The speaker device according to claim 1, wherein the bistable device comprises a first biasing element that drives the blocking mechanism towards the open state.

5. The speaker device according to claim 4, wherein the bistable device comprises a second biasing element that drives the blocking mechanism towards the closed state.

6. The speaker device according to claim 1, wherein the bistable device comprises a biasing element that drives the blocking mechanism towards the closed state.

7. The speaker device according to claim 1, wherein the active vent comprises an electronic actuator.

8. The speaker device according to claim 7, where the electronic actuator comprises a magnetically susceptible material and an electromagnet, and wherein the electronic actuator is configured to drive the blocking mechanism towards the open state or towards the closed state upon activation.

9. The speaker device according to claim 1, wherein the blocking mechanism is linearly movable between the open state and the closed state.

10. An active vent configured to reduce occlusion of an ear canal of a user, the active vent comprising:
- a passage that is configured to provide a fluid connection between the ear canal and a surrounding of the user when the speaker device is in the ear canal of the user;
- a blocking mechanism having a closed state in which the blocking mechanism blocks the passage at least partially, and an open state in which the blocking mechanism does not block the passage or blocks the passage less compared to an amount of passage blocking in the closed state; and
- a bistable device configured to keep the blocking mechanism in the open state or the closed state;
- wherein the bistable device comprises a buckling element, wherein the buckling element is configured to transition between a first state in which the buckling element bends towards a first direction, and a second state in which the buckling element bends towards a second direction opposite from the first direction.

11. The active vent according to claim 10, wherein the blocking mechanism is unstable when the blocking mechanism is between the open and the closed state.

12. The active vent according to claim 10, wherein the blocking mechanism has a center position, wherein the bistable device is configured to drive the blocking mechanism toward the open state when the blocking mechanism is between the open state and the center position, and wherein the bistable device is configured to drive the blocking mechanism toward the closed state when the blocking mechanism is between the center position and the closed state.

13. The active vent according to claim 10, wherein the bistable device comprises a first biasing element that drives the blocking mechanism towards the open state.

14. The active vent according to claim 13, wherein the bistable device comprises a second biasing element that drives the blocking mechanism towards the closed state.

15. The active vent according to claim 10, wherein the bistable device comprises a biasing element that drives the blocking mechanism towards the closed state.

16. The active vent according to claim 10, further comprising an electronic actuator.

17. The active vent according to claim 16, where the electronic actuator comprises a magnetically susceptible material and an electromagnet, and wherein the electronic actuator is configured to drive the blocking mechanism towards the open state or towards the closed state upon activation.

18. The active vent according to claim 10, wherein the blocking mechanism is linearly movable between the open state and the closed state.

19. A device comprising the active vent of claim 10.

20. The device of claim 19, wherein the device is a hearing device having a speaker.

* * * * *